(12) United States Patent
Lalinde et al.

(10) Patent No.: US 11,307,620 B2
(45) Date of Patent: Apr. 19, 2022

(54) CAMERA SYSTEM HOUSING

(71) Applicant: HEWLETT-PACKARD DEVELOPMENT COMPANY, L.P., Houston, TX (US)

(72) Inventors: Paul Roberto Lalinde, Houston, TX (US); Baosheng Zhang, Houston, TX (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 917 days.

(21) Appl. No.: 16/076,916

(22) PCT Filed: Apr. 17, 2017

(86) PCT No.: PCT/US2017/027948
§ 371 (c)(1),
(2) Date: Aug. 9, 2018

(87) PCT Pub. No.: WO2018/194547
PCT Pub. Date: Oct. 25, 2018

(65) Prior Publication Data
US 2021/0200282 A1    Jul. 1, 2021

(51) Int. Cl.
*G06F 1/16* (2006.01)
*G03B 17/02* (2021.01)
*H04N 5/225* (2006.01)

(52) U.S. Cl.
CPC .......... *G06F 1/1686* (2013.01); *G03B 17/02* (2013.01); *G06F 1/1616* (2013.01);
(Continued)

(58) Field of Classification Search
CPC ....... G03B 17/02; G03B 17/04; G06F 1/1616; G06F 1/1686; G06F 1/1681; G06F 1/1688; H04N 5/2257
See application file for complete search history.

(56) References Cited

U.S. PATENT DOCUMENTS 6,256,192 B1    7/2001    Shannon
8,242,924 B2    8/2012    Huang et al.
(Continued)

FOREIGN PATENT DOCUMENTS

CN    101523891 A    9/2009
CN    201594328 U    9/2010
(Continued)

OTHER PUBLICATIONS

Raza, "The Art of Hiding Cellphone, Laptop Cameras From Hackers and Government", Retrieved from Internet: https://www.hackread.com/art-hiding-cellphone-webcams-hackers-government/, 2017, 8 Pages.

*Primary Examiner* — Vinh T Lam
(74) *Attorney, Agent, or Firm* — Brooks, Cameron & Huebsch PLLC

(57) ABSTRACT

Example implementations relate to a camera system housing. In some examples, an apparatus may comprise a camera system housing including a camera and a gear mechanism. The camera housing may be coupled to a computing device. In some examples, the camera system housing may retract into the computing device to an enclosed position such that the housing is disposed at a first angle relative to the computing device responsive to actuation of the gear mechanism in a first direction and open out of the computing device to an enclosed position such that the housing is disposed at a second angle relative to the computing device responsive to actuation of the gear mechanism in a second direction.

12 Claims, 5 Drawing Sheets

(52) U.S. Cl.
CPC .......... *G06F 1/1681* (2013.01); *G06F 1/1688* (2013.01); *H04N 5/2257* (2013.01)

(56) References Cited

U.S. PATENT DOCUMENTS

| | | | |
|---|---|---|---|
| 8,264,599 B2 | 9/2012 | Liu | |
| 8,736,753 B2* | 5/2014 | Kaga | G03B 13/02 396/541 |
| 9,383,777 B1 | 7/2016 | Riddiford et al. | |
| 2005/0073155 A1 | 4/2005 | Weng | |
| 2006/0268505 A1* | 11/2006 | Krah | G06F 1/1679 361/679.55 |
| 2007/0140685 A1 | 6/2007 | Wu | |
| 2011/0291935 A1 | 12/2011 | Liu | |
| 2013/0163977 A1* | 6/2013 | Mack | H04N 5/2252 396/428 |
| 2013/0200911 A1 | 8/2013 | Panagas | |
| 2014/0218857 A1 | 8/2014 | Liu et al. | |
| 2015/0002721 A1* | 1/2015 | Ujiie | H04N 5/225251 361/679.01 |
| 2015/0131852 A1* | 5/2015 | Sweetser | G06F 3/0346 382/103 |
| 2017/0075196 A1* | 3/2017 | Cury | F16M 13/027 |
| 2017/0171528 A1* | 6/2017 | Ent | G06F 1/1607 |
| 2018/0054565 A1* | 2/2018 | Smith | H04N 5/2354 |

FOREIGN PATENT DOCUMENTS

| | | |
|---|---|---|
| CN | 105353829 A | 2/2016 |
| CN | 205239371 U | 5/2016 |
| CN | 205692175 U | 11/2016 |
| CN | 106447666 A | 2/2017 |
| GB | 2347813 A | 9/2000 |
| JP | 07-212253 A | 8/1995 |
| JP | 10-164414 A | 6/1998 |
| WO | 0199404 A2 | 12/2001 |
| WO | 2013081632 A1 | 6/2013 |

* cited by examiner

CAMERA SYSTEM HOUSING

BACKGROUND

Computing devices such a laptop computers, desktop computers, various phone such as mobile, etc. may include a camera. The camera may capture electronic images such as photos and/or video images. The camera may capture the electronic images responsive to an input such as an input provided by a user and/or an application, among other possibilities. The cameras may be located on an external surface of the computing device to promote capture of the electronic images.

DETAILED DESCRIPTION

Privacy is a concern for users of computing devices such as laptops, cellular phones, and other electronic devices including cameras. For instance, some nefarious entities may seek to gain control of a camera in a computing device for a variety of undesired reasons. For instance, a nefarious entity may through various mechanisms acquire control of a camera included in a computing device and/or gain access to images captured by a camera included in a computing device unbeknownst to a user of the computing device.

In some approaches, this may be possible because the camera may be visible and accessible to the user at all times during operation of the computing device. For example, in some approaches the camera may be mounted on an exterior portion of a computing device (e.g., on a display of the computing device) where it may be visible and accessible to the user during operation of the computing device.

In contrast, some examples of the disclosure may allow for a camera system housing that may be retracted or otherwise folded into a recess (e.g., an opening) provided in the computing device. This may allow for the camera to not be visible and/or accessible to a user of the computing device when the camera is not in operation. In some examples, this may further allow for the camera to not be visible and/or accessible to the user of the computing device unless the user performs operations to make the camera visible and/or accessible. Accordingly, examples herein may allow for a camera system housing with improved security and/or privacy as compared to some approaches.

Examples of the disclosure include apparatuses and systems including a camera system housing. In some examples, an apparatus may include a camera system housing including a camera and a gear mechanism. The camera housing may be coupled to a computing device. In some examples, the camera system housing may retract into the computing device to an enclosed position such that the housing is disposed at a first angle relative to the computing device responsive to actuation of the gear mechanism in a first direction and open out of the computing device to an enclosed position such that the housing is disposed at a second angle relative to the computing device responsive to actuation of the gear mechanism in a second direction.

As used herein, "disposed" means a location at which something is physically positioned. For example, the camera system housing being disposed at a particular angle means that the camera system housing is in a particular physical position having a particular angle associated therewith. Similarly, the camera system housing being disposed on a base portion of a computing device, for example, means that the camera system housing is physically coupled to the base portion of the computing device at a particular physical location and/or position.

Figure 1:
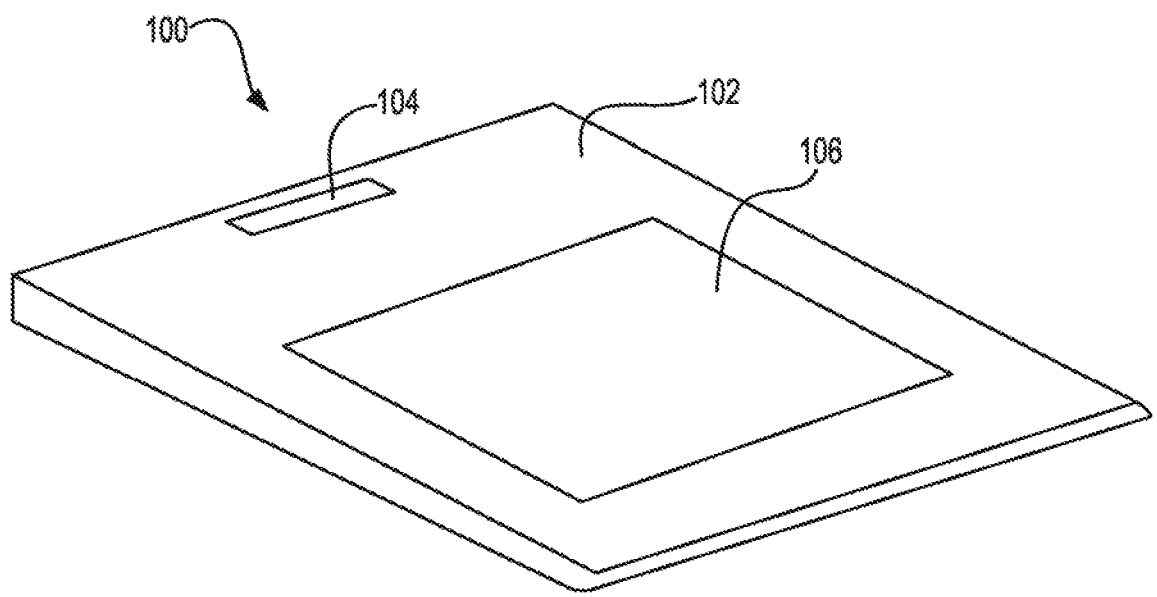
FIG. 1 illustrates an example of an apparatus including a camera system housing consistent with the disclosure.

FIG. 1 illustrates an example of an apparatus including a camera system housing consistent with the disclosure. As shown in FIG. 1, the apparatus 100 may be a computing device such as a laptop computer, desktop computer, tablet, or other computing device, and may include a base portion 102, camera system housing 104, and, optionally, keypad portion 106. In the example of FIG. 1, the camera system housing 104 is retracted into the computing device 100 such that the camera system housing 104 is disposed at a first angle relative to the computing device 100.

The camera system housing 104 may be made from synthetic, semi-synthetic, or organic compounds, or combinations thereof. For example, the camera system housing 104 may be made from polymers, plastics (e.g., thermoplastics), metals, etc. In some examples, the camera system housing 104 may be painted or dyed to match or contrast with a color associated with the computing device 100.

In some examples, the camera system housing 104 may be retracted into the computing device 100 such that a side of the camera system housing 104 is substantially parallel to a surface of the computing device 100. For example, the camera system housing 104 may be retracted into the computing device 100 such that a side of the camera system housing 104 is substantially flush with the base portion 102 of the computing device 100. In some examples, the side of the camera system housing 104 that is substantially flush with the base portion 102 of the computing device 100 may be a side of the camera system housing 104 that does not include a camera. Accordingly, a recess may be provided in the computing device 100 that provides enough space for the camera system housing 104 to be retracted into the computing device 100.

As used herein, the term "substantially" intends that the characteristic needs not be absolute, but is close enough so as to achieve the advantages of the characteristic. For example, "substantially parallel" is not limited to absolute parallelism, and can include orientations that are intended to be parallel but due to manufacturing limitations may not be precisely parallel. For example, "substantially parallel" features are at least closer to a parallel orientation than a perpendicular orientation, and generally are formed within a few degrees of parallel. Similarly, "substantially perpendicular" is not limited to absolute perpendicularity, and can include orientations that are intended to be parallel but due to manufacturing limitations may not be precisely perpendicular. For example, "substantially perpendicular" features are at least closer to a perpendicular orientation than a parallel orientation, e.g., within a few degrees of perpendicular.

Although not shown in FIG. 1, the camera system housing 104 may have a gear mechanism associated therewith. In some examples, the gear mechanism (e.g., gear mechanism 205 illustrated in FIG. 2 and gear mechanism 305 illustrated in FIG. 3) may be actuated to move the camera system housing 104 into the retracted enclosed position illustrated in FIG. 1 and/or the gear mechanism may be actuated to move the camera system housing 104 into an open position, as shown in FIGS. 2 and 3, herein.

Figure 2:
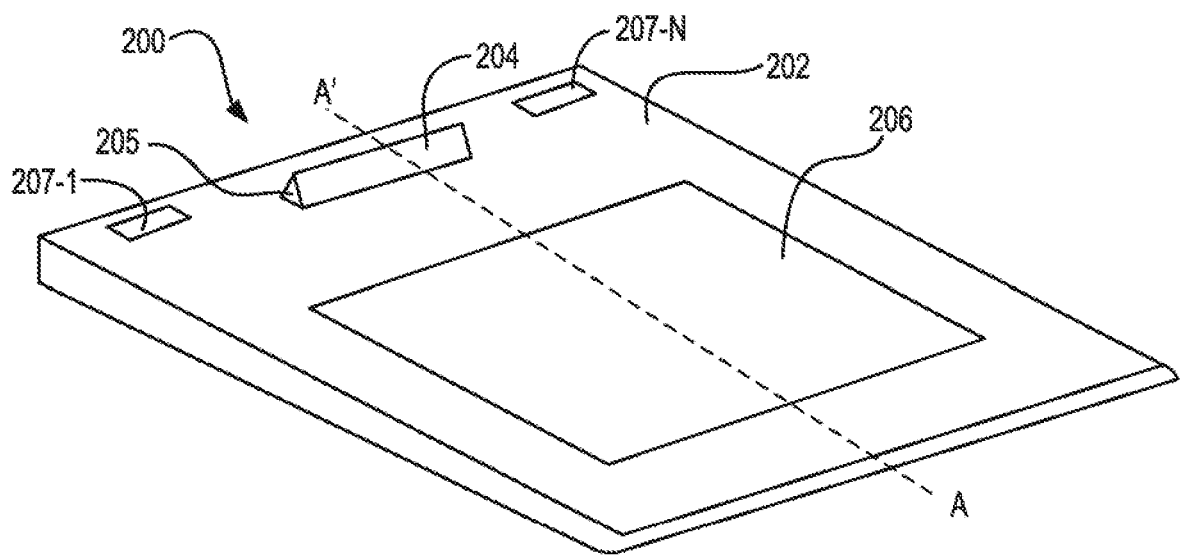
FIG. 2 illustrates another example of an apparatus including a camera system housing consistent with the disclosure.
Figure 3:
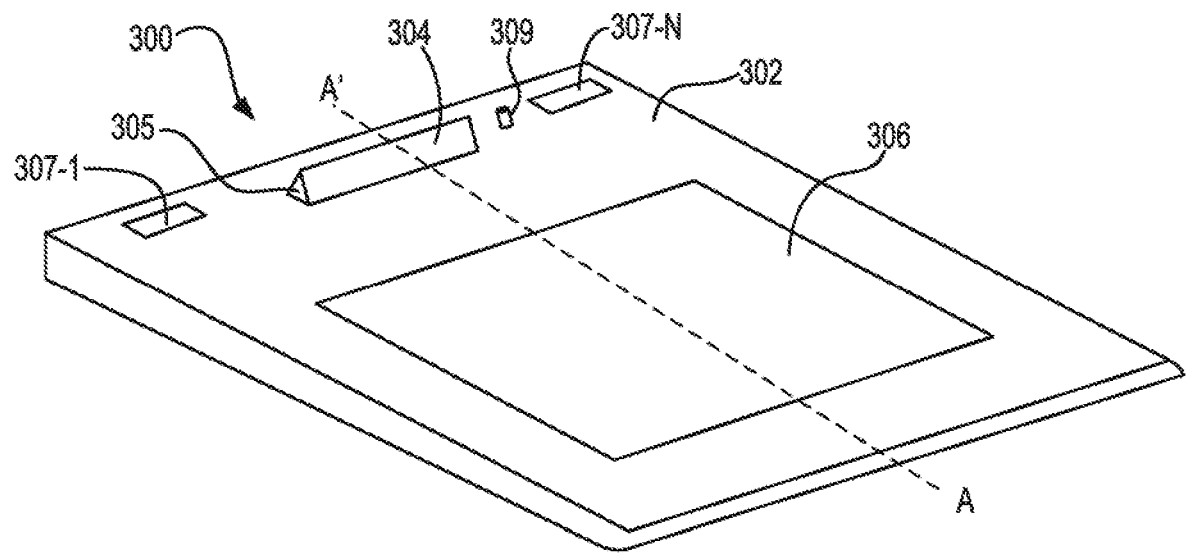
FIG. 3 illustrates yet another example of an apparatus including a camera system housing consistent with the disclosure.

FIG. 2 illustrates another example of an apparatus including a camera system housing consistent with the disclosure. As shown in FIG. 2, the apparatus 200 may be a computing device such as a laptop computer, desktop computer, tablet, or other computing device, and may include a base portion 202, camera system housing 204, gear mechanism 205, display connectors 207-1, . . . , 207-N, and, optionally, keypad portion 206. In the example of FIG. 2, the camera system housing 204 is opened out of the computing device 200 such that the camera system housing 204 is disposed at a second angle relative to the computing device 200.

The gear mechanism 205 may include a plurality of gears that may be actuated to move the camera system housing 204. For example, the gear mechanism 205 may include a plurality of gears that may be actuated to move the camera system housing 204 between various angles to either retract the camera system housing 204 into the computing device 200 (as shown in FIG. 1), or open the camera system housing 204 to an open position as shown in FIGS. 2 and 3. In some examples, the camera system housing 204 may be retracted to provide security and/or privacy for a user, and may be opened to allow the user to operate the camera.

In some examples, the camera system housing 204 illustrated in FIG. 2 has been opened out of the computing device 200 such that the camera system housing 204 is disposed at a second angle relative to the computing device 200 responsive to actuation of the gear mechanism 205. In some examples, the gear mechanism 205 may be actuated in a first direction to cause the camera system housing 204 to retract the camera system housing 204 into the enclosed position illustrated in FIG. 1, and gear mechanism 205 may be actuated in a second direction to cause the camera system housing 204 to be opened to the open position illustrated in FIG. 2.

In some examples, when the camera system housing 204 is in the open position, a side of the camera system housing 204 that includes a camera (e.g., camera 408 illustrated in FIG. 4) may be substantially perpendicular to a surface of the computing device. Examples are not so limited; however, and the side of the camera system housing 204 that includes a camera may be oriented, for example via actuation of the gear mechanism 205, at any reasonable angle relative to the computing device 200 that the camera is visible and/or accessible to a user.

In some examples, the camera system housing 204 may be located equidistant from a first display connector 207-1 and a second display connector 207-N disposed on the base portion 202 of the computing device 200. Examples are not so limited; however, and the camera system housing 204 may be located at a position that is closer to one of the display connectors 207 than the other. For example, the camera system housing 204 may be located at a position closer to the first display connector 207-1 than the second display connector 207-N, or vice versa. Although not shown for clarity, the first display connector 207-1 and/or the second display connector 207-N may be connected to a display such as a computer screen.

In some examples, the camera system housing 204 may be located on the base portion 202 of the computing device 200 in a position between the keypad portion 206 and the display connectors 207.

FIG. 3 illustrates yet another example of an apparatus including a camera system housing consistent with the disclosure. As shown in FIG. 3, the apparatus 300 may be a computing device such as a laptop computer, desktop computer, tablet, or other computing device, and may include a base portion 302, camera system housing 304, gear mechanism 305, display connectors 307-1, . . . , 307-N, gear actuation mechanism 309, and, optionally, keypad portion 306. In the example of FIG. 3, the camera system housing 304 is opened out of the computing device 300 such that the camera system housing 304 is disposed at a second angle relative to the computing device 300.

In some examples, the gear actuation mechanism 309 may be coupled to gear mechanism 305 such that actuation of the gear actuation mechanism 309 causes the gear mechanism 305 to operate. For example, the gear actuation mechanism 309 may be actuated to cause the gear mechanism 305 to move the camera system housing 304 between various angles to either retract the camera system housing 304 into the computing device 300 (as shown in FIG. 1), or open the camera system housing 304 to an open position as shown in FIGS. 2 and 3.

In some examples, the gear actuation mechanism 309 may be operable to lock the camera system housing 304 in a first position and/or in a second position. For example, the gear actuation mechanism 309 may be operable to lock the camera system housing 304 in the enclosed position (as shown in FIG. 1) and/or the open position (as shown in FIGS. 2 and 3).

The gear actuation mechanism 309 may include a button, pin, rotatable knob, a watch crown-type pin and knob combination, crank, switch, lever, or combination thereof. In some example, the gear actuation mechanism 309 may include a rotatable knob that, when actuated in a particular direction, may cause actuation of the gear mechanism 305 to move the camera system housing 304, as described above. In some examples where the gear actuation mechanism 309 is a lever, the lever may be coupled to the gear mechanism 305, and the camera system housing 304 may include a hinge coupled to the base portion 302 of the computing system 300. Actuation of the lever may cause actuation of the gear mechanism 305 to rotate the camera system housing about the hinge.

Figure 4:
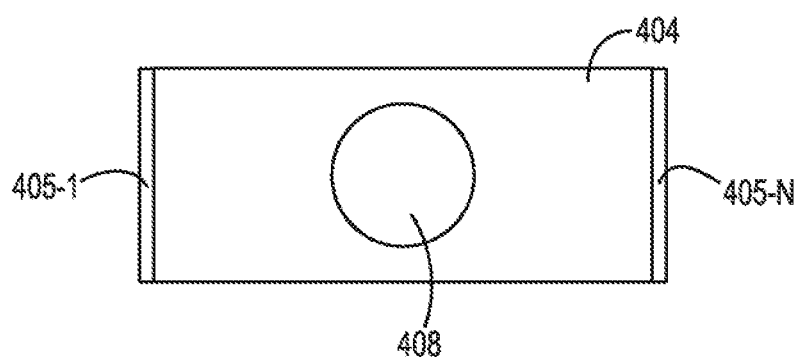
FIG. 4 illustrates an example of a camera system housing consistent with the disclosure.
Figure 5:
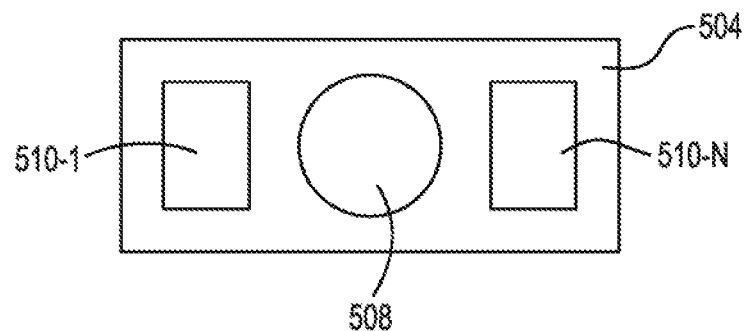
FIG. 5 illustrates an example of a camera system housing including a plurality of speakers consistent with the disclosure.
Figure 6:
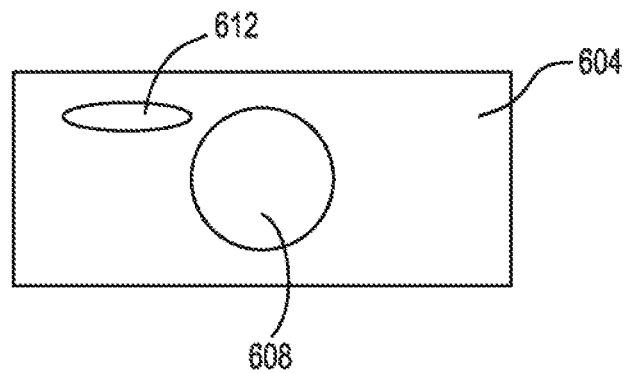
FIG. 6 illustrates an example of a camera system housing including a microphone consistent with the disclosure.

FIGS. 4, 5, and 6 illustrate various examples of the camera system housing as seen from the perspective along dashed line A to A' shown in FIGS. 2 and 3. Although not explicitly shown in FIGS. 5 and 6, the gear mechanism 405 shown in FIG. 4 may be included in the camera system housing 504 illustrated in FIG. 5 and/or the camera system housing 604 illustrated in FIG. 6.

In FIG. 4, an example of a camera system housing consistent with the disclosure is illustrated. As shown in FIG. 4, the camera system housing 404 may include a camera 408 and gear mechanism 405-1, . . . , 405-N. The gear mechanism 405 may include gears on each end of the camera system housing 404. In some examples, gear mechanism 405 may allow for the camera system housing 404 to be locked at a selectable orientation (e.g., some angle with respect to the base portion (e.g., base portion 102, 202, and 302 illustrated in FIGS. 1-3).

In some examples, gear mechanism 405-1 may include a portion of the gears associated with performing the operations discussed herein, and gear mechanism 405-N may include another portion of the gears associated with performing the operations discussed herein. For example, gear mechanism 405-1 may include gears which, when actuated allow for one side of the camera system housing 404 to be moved, while gear mechanism 405-N may include gears which, when actuated allow for the other side of the camera system housing 404 to be moved. In some examples, gear mechanism 405-1 and gear mechanism 405-N may be operated concurrently through actuation of the gear actuation mechanism (e.g., gear actuation mechanism 309 illustrated in FIG. 3) to, for example, move the camera system housing 404 from a first position to a second position as described herein.

The camera 408 may include a charge coupled device (CCD), complementary metal-oxide semiconductor (CMOS) sensor, a lens, and/or various circuitry to cause operation of the camera 408. Examples of cameras include 3D cameras, infrared cameras, 3D scanner cameras, and other visual adapters.

In some examples, the camera 408 may be operable as a projector to, for example, project images and/or video to a wall or screen physically separate from the computing device (e.g., computing device 100, 200, 300 illustrated in FIG. 1-3). For example, the camera 408 may include a projector (e.g., projector 919 illustrated in FIG. 9).

FIG. 5 illustrates an example of a camera system housing including a plurality of speakers consistent with the disclosure. As shown in FIG. 5, the camera system housing 504 may include camera 508 and speakers 510-1, ..., 510-N. The speakers 510-1, ..., 510-N may be powered off when the camera system housing 504 is in the retracted enclosed position illustrated in FIG. 1, and may be powered on when the camera system housing 504 is in the opened position illustrated in FIGS. 2 and 3. Examples are not so limited; however, and the speakers 510 may be powered on when the camera system housing 504 is in the retracted enclosed position.

The speakers 510 may include an electroacoustic transducer which may convert an electrical signal in a sound signal. Although a pair of speakers 510-1 and 510-N are shown in FIG. 5, examples are not so limited, and camera system housing 504 may include a single speaker or more than two speakers. In some examples, the speakers 510 may be covered by a protective material such as a screen, mesh, or speaker grate.

FIG. 6 illustrates an example of a camera system housing including a microphone consistent with the disclosure. As shown in FIG. 6, the camera system housing 604 may include camera 608 and microphone 612. The microphone 612 may be powered off when the camera system housing 604 is in the retracted enclosed position illustrated in FIG. 1, and may be powered on when the camera system housing 604 is in the opened position illustrated in FIGS. 2 and 3.

The microphone 612 may include a transducer that converts a sound signal into an electrical signal. Although a single microphone is illustrated in FIG. 6, examples are not so limited, and the camera system housing 604 may include more than one microphone in some examples.

Figure 7:
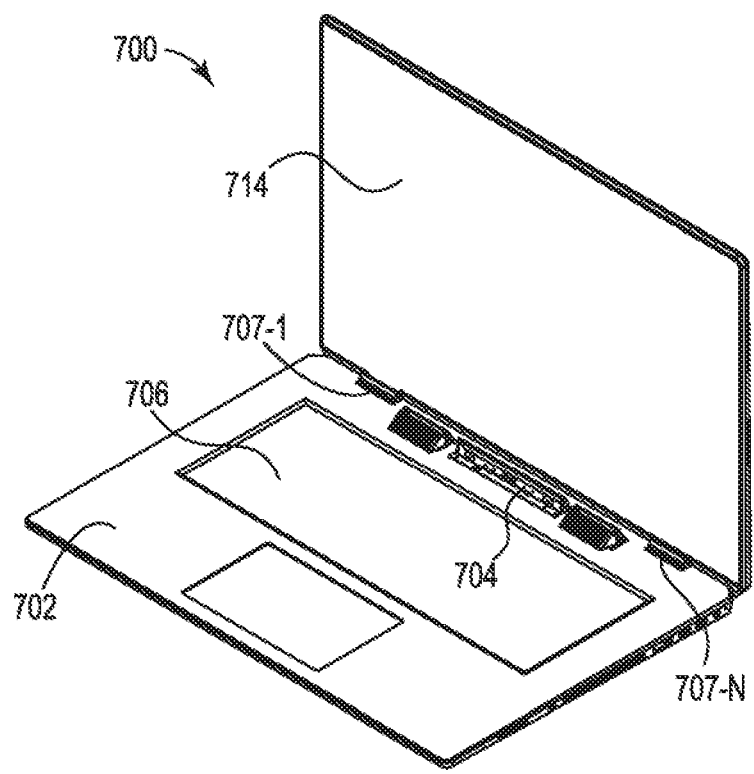
FIG. 7 illustrates an example of a computing system including a camera system housing consistent with the disclosure.

FIG. 7 illustrates an example of a computing system including a camera system housing consistent with the disclosure. In the example shown in FIG. 7, the computing system 700 comprises a laptop computer. The computing system 700 may include a display screen 714, which may be coupled to the base portion 702 via display connectors 707-1 and 707-N. The computing system 700 may also include a camera system housing 704 and a keypad portion 706.

As described in connection with FIGS. 1-3, herein, the camera system housing 704 may be retracted into a recess in the base portion 702 of the computing system 700, or may be opened to an open position as shown in FIG. 7. Rotation of the camera system housing between the enclosed position and the open position may be facilitated through actuation of gear mechanism described in more detail herein.

Figure 8:
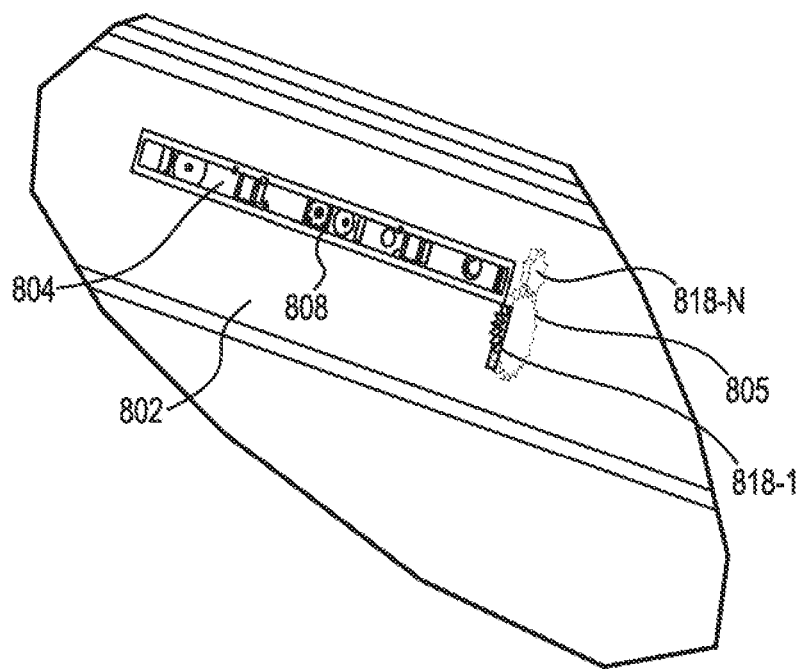
FIG. 8 illustrates an example of a camera system housing including a gear mechanism consistent with the disclosure.

FIG. 8 illustrates an example of a camera system housing including a gear mechanism consistent with the disclosure. As shown in FIG. 8, the camera system housing 804 includes camera 808 and gear mechanism 805. The camera system housing 804 may be coupled to base portion 802 for example, via gear mechanism 805. Base portion 802 may be a base portion of a computing system as described in connection with FIGS. 1-3 and 7, herein.

As shown in FIG. 8, gear mechanism 805 may include a plurality of gears 818-1 ..., 818-N. Although two gears are illustrated in the gear mechanism 805 illustrated in FIG. 8, fewer or additional gears may be used. Further, although the gear mechanism 805 is shown only at one end of the camera system housing 804 illustrated in FIG. 8, a second gear mechanism may be provided at the other end of camera system housing 804, and/or a portion of gear mechanism 805 may be located at each end of camera system housing 804.

Figure 9:
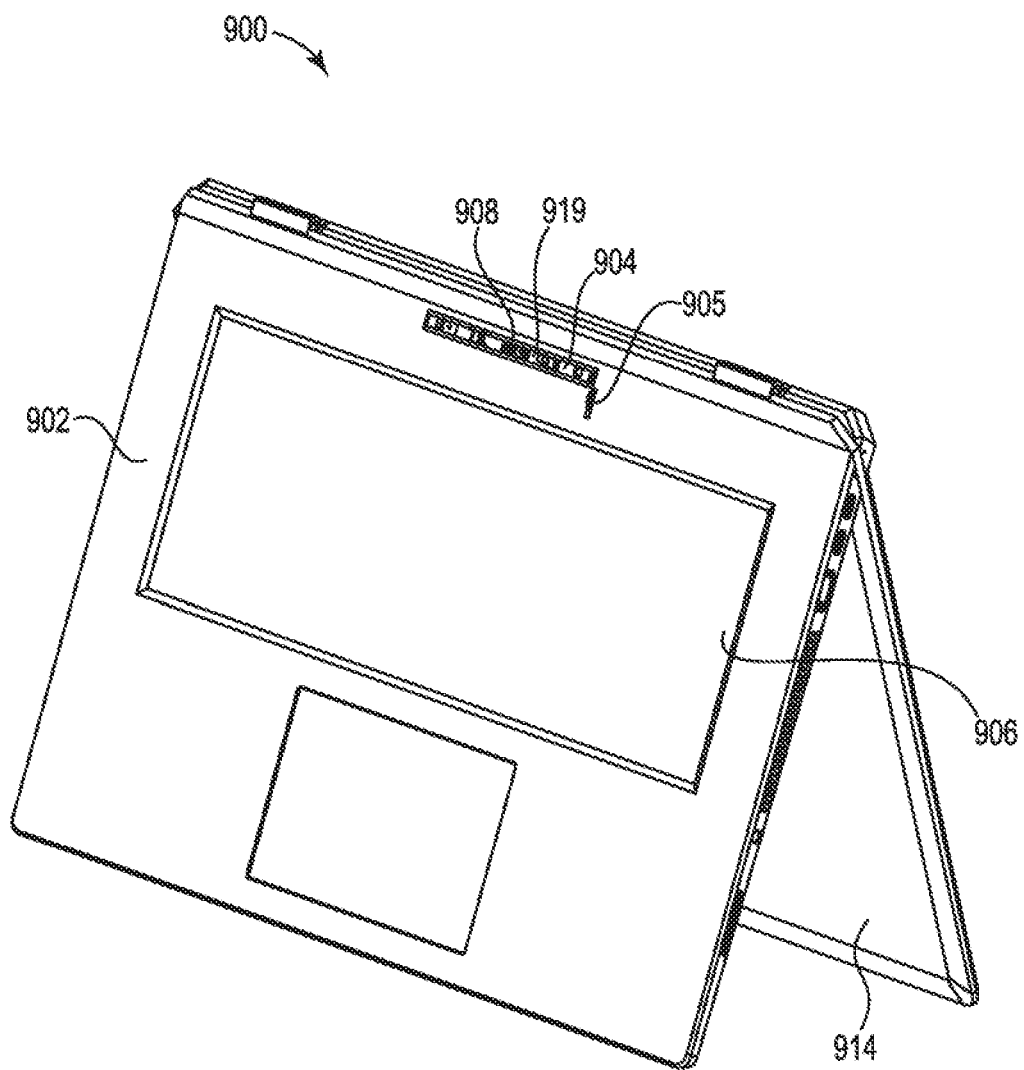
FIG. 9 illustrates another example of a computing system including a camera system housing consistent with the disclosure.

FIG. 9 illustrates another example of a computing system including a camera system housing consistent with the disclosure. The computing system 900 illustrated in FIG. 9 may be a laptop computer such as a convertible laptop computing system. Computing system 900 may include camera system housing 904, which may be disposed in a recess in the base portion 902 of the computing system 900. In some examples, the camera system housing 904 may be coupled via gear mechanism 905 to the base portion 902 of the computing system 900.

In some examples, the camera system housing 904 may be unlocked from an enclosed position when the display 914 is opened. For example, the camera system housing 904 may be coupled to a hinge and/or gear mechanism 905, which may be actuated to move the camera system housing 904 to the open position when the display 914 is opened.

Camera system housing 904 may include a camera 908 and/or projector 919. In some examples, the computing device 900 may be oriented such that the display portion 914 and the base portion 902 from the shape of the letter "A." This orientation may be referred to herein as a "tent configuration." When oriented in the tent configuration as shown in FIG. 9, the camera system housing 904 may be rotated to a position that facilitates projection of an image, video, or other media content being displayed by the computing device 900 onto a wall or other surface.

In some examples, when oriented in the tent configuration, the camera system housing 904 may be rotated to a position in which the camera 908 and/or projector 919 are substantially parallel to the surface of the base portion 902. Examples are not so limited; however, and the camera system housing 904 may be rotated to any open position that facilitates image capture by the camera 908 and/or projection by the projector 919.

In some examples, the camera 908 may be used to scan an image such as a 3D image. For example, the camera 908 may be a camera capable of analyzing real-world objects and/or environments to collect data regarding the shape and/or or appearance of the objects or environment. The collected data may then be used to construct digital 3D models of the objects and/or environment.

Although some Figures herein show a single camera (e.g., camera 408 illustrated in FIG. 4), a single microphone (e.g., microphone 612 illustrated in FIG. 6), a single projector (e.g., projector 919 illustrated in FIG. 9), examples are not so limited and the camera system housing may include a plurality of cameras, microphones, speakers, and/or projectors.

In the foregoing detailed description of the disclosure, reference is made to the accompanying drawings that form a part hereof, and in which is shown by way of illustration how examples of the disclosure may be practiced. These examples are described in sufficient detail to enable those of ordinary skill in the art to practice the examples of this disclosure, and it is to be understood that other examples may be utilized and that process, electrical, and/or structural changes may be made without departing from the scope of the disclosure. As used herein, designators such as "N", etc., particularly with respect to reference numerals in the drawings, indicate that a number of the particular feature so designated can be included. A "plurality of" is intended to refer to more than one of such things. Multiple like elements may be referenced herein by their reference numeral without a specific identifier at the end. For example, a plurality of speakers 510-1, ..., 510-N may be referred to herein as speakers 510.

The figures herein follow a numbering convention in which the first digit corresponds to the drawing figure number and the remaining digits identify an element or component in the drawing. For example, reference numeral 104 may refer to element "04" in FIG. 1 and an analogous element may be identified by reference numeral 204 in FIG. 2. Elements shown in the various figures herein can be added, exchanged, and/or eliminated so as to provide a number of additional examples of the disclosure. In addition, the proportion and the relative scale of the elements provided in the figures are intended to illustrate the examples of the disclosure, and should not be taken in a limiting sense.

What is claimed:

1. An apparatus, comprising:
   a camera system housing including a camera, a gear mechanism and a gear actuation mechanism coupled to the gear mechanism, the camera housing coupled to a computing device, the gear actuation mechanism to cause actuation of the gear mechanism responsive to actuation of the gear actuation mechanism to cause the camera system housing to:
   retract into the computing device to an enclosed position such that the housing is disposed at a first angle relative to the computing device responsive to actuation of the gear mechanism in a first direction; and
   open out of the computing device to an open position such that the housing is disposed at a second angle relative to the computing device responsive to actuation of the gear mechanism in a second direction, wherein the gear mechanism is to lock the camera system housing in the enclosed position or the open position.

2. The apparatus of claim 1, wherein the camera system housing further includes a speaker and a microphone.

3. The apparatus of claim 1, wherein the camera system housing further includes a projector.

4. The apparatus of claim 1, wherein the camera system housing is located on a base portion of the computing device.

5. The apparatus of claim 4, wherein the camera system housing is located on the base portion of the computing device in a location between a keyboard portion of the computing device and a display connector of the computing device.

6. The apparatus of claim 1, wherein:
   the first angle is substantially parallel to a base portion of the computing device; and
   the second angle is between the first angle and an angle substantially parallel to a display portion of the computing device.

7. A system, comprising:
   a computing device;
   a gear actuation mechanism coupled to the computing device; and
   a camera system housing including a camera and gears, the camera system housing coupled to the computing device, and the gears coupled to the gear actuation mechanism, wherein
   the gear actuation mechanism is to cause actuation of the gears to move the camera housing system from a first position to a second position, and wherein the gear actuation mechanism is to lock the camera system housing in the first position or the second position.

8. The system of claim 7, wherein the first position is a position in which a side of the camera system housing that does not include the camera is substantially flush with a surface of the computing device.

9. The system of claim 7, wherein the second position is a position in which a side of the camera system housing that includes the camera is substantially perpendicular to a surface of the computing device.

10. An apparatus, comprising:
    a camera system housing including a gear mechanism, the camera system housing coupled via the gear mechanism to a computing device;
    a gear actuation mechanism coupled to the gear mechanism and the computing device, the gear actuation mechanism actuatable to enable the gear mechanism to move the camera system housing from a first position to a second position, wherein the camera system housing is disposed in a recess in the computing device large enough to accommodate the camera system housing when in the first position, and wherein the gear actuation mechanism is to lock the camera system housing in the first position or the second position.

11. The apparatus of claim 10, wherein the camera housing system is disposed on a base portion of the computing device and is located equidistant from a first display connector and a second display connector disposed on the base portion of the computing device.

12. The apparatus of claim 10, wherein the camera system housing includes a camera, a speaker, a microphone, or a projector.

* * * * *